(12) United States Patent
Amano et al.

(10) Patent No.: US 11,287,576 B2
(45) Date of Patent: Mar. 29, 2022

(54) OPTICAL CONNECTOR AND APPARATUS EQUIPPED THEREWITH

(71) Applicants: KYOCERA CORPORATION, Kyoto (JP); NATIONAL INSTITUTE OF ADVANCED INDUSTRIAL SCIENCE AND TECHNOLOGY, Tokyo (JP)

(72) Inventors: Takeru Amano, Tokyo (JP); Akihiro Noriki, Tokyo (JP); Masatoshi Tsunoda, Kyoto (JP)

(73) Assignees: KYOCERA CORPORATION, Kyoto (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/981,907

(22) PCT Filed: Mar. 20, 2019

(86) PCT No.: PCT/JP2019/011769
§ 371 (c)(1),
(2) Date: Sep. 17, 2020

(87) PCT Pub. No.: WO2019/182028
PCT Pub. Date: Sep. 26, 2019

(65) Prior Publication Data
US 2021/0109288 A1    Apr. 15, 2021

(30) Foreign Application Priority Data
Mar. 20, 2018  (JP) .............................. JP2018-053034

(51) Int. Cl.
G02B 6/30    (2006.01)
G02B 6/26    (2006.01)
G02B 6/38    (2006.01)

(52) U.S. Cl.
CPC ............... *G02B 6/30* (2013.01); *G02B 6/262* (2013.01); *G02B 6/3883* (2013.01); *G02B 6/3833* (2013.01)

(58) Field of Classification Search
CPC ......... G02B 6/30; G02B 6/262; G02B 6/3873
See application file for complete search history.

(56) References Cited

U.S. PATENT DOCUMENTS 7,369,728 B1   5/2008   Hasegawa et al.
7,447,405 B1   11/2008  Yamada et al.
(Continued)

FOREIGN PATENT DOCUMENTS

JP   2003-523085 A    7/2003
WO   2017212861 A1    12/2017

OTHER PUBLICATIONS

Pitwon, Richard CA, et al. "FirstLight: Pluggable optical interconnect technologies for polymeric electro-optical printed circuit boards in data centers." Journal of Lightwave Technology 30.21 (2012): 3316-3329.

(Continued)

*Primary Examiner* — Michael P Mooney
(74) *Attorney, Agent, or Firm* — Duane Morris LLP

(57) ABSTRACT

Provided is an optical connector used for connecting an optical waveguide substrate and an optical-fiber connector member, where the optical connector comprises a plurality of positioning structures, each having a cylindrical hole for inserting another end of a pin which has an end inserted into the connector member, and a groove formed on a second surface perpendicular to a first surface on which an open end (Continued)

of the hole is located, and where the groove and the hole are continuous, the groove has an arc-shaped cross section, and a center of a circle formed by a cross section of the hole and a center of an arc formed by the cross section of the groove are identical, and when the optical connector is coupled to the optical waveguide substrate that comprises a plurality of protrusions having a rectangular cross section, in each of the plurality of positioning structures, at least two corners of a corresponding protrusion among the plurality of protrusions are supported by an inner wall of the groove.

7 Claims, 15 Drawing Sheets

(56) References Cited

U.S. PATENT DOCUMENTS

| | | | |
|---|---|---|---|
| 7,889,958 B2 | 2/2011 | Kamada et al. | |
| 2001/0010743 A1* | 8/2001 | Cayrefourcq | G02B 6/4232 |
| | | | 385/88 |
| 2003/0228109 A1* | 12/2003 | Uekawa | G02B 6/4224 |
| | | | 385/49 |
| 2014/0064675 A1 | 3/2014 | Tanaka | |
| 2019/0137699 A1* | 5/2019 | Tsunoda | G02B 6/42 |

OTHER PUBLICATIONS

International Preliminary Report on Patentability in International Patent Application No. PCT/JP2019/011769, dated Oct. 1, 2020, in 7 pages, English translation provided.

* cited by examiner (a)

(b)

OPTICAL CONNECTOR AND APPARATUS EQUIPPED THEREWITH

TECHNICAL FIELD

The present disclosure relates to an optical connector and an apparatus equipped therewith.

BACKGROUND ART

In many devices, components such as processors and memory units are interconnected through electric signal paths. However, delay required for data transmission between components becomes shorter in recent years, so that it becomes difficult to meet the requirement in the data transmission using electric signal paths. As such, data transmission using optical signals is attracting attention.

For example, a method for disposing optical waveguides in components on a polymer waveguide substrate formed by a poly-chlorinated biphenyl (PCB) or the like and using the optical waveguides as a guiding portion for guiding light into the components is proposed in Richard C. A. Pitwon et. al, "Firstlight: Pluggable Optical Interconnect Technologies for Polymeric Electro-Optical Printed Circuit Boards in Data Centers", Journal of Light wave technology, vol. 30, No. 21, Nov. 1, 2012. For example, a flexible optical fiber array is used as the guiding portion for guiding light into the optical waveguides from outside thereof.

An optical connector is arranged at an end of the optical fiber array. If the optical fiber array is connected to the optical waveguides on the polymer waveguide substrate, connection between the optical waveguides and the optical fiber array may be implemented by providing another optical connector on the polymer waveguide substrate side and coupling both the optical connectors together.

However, misalignment between optical fiber cores and optical waveguide cores on the opposing surfaces causes optical connection loss. The optical connection loss increases with increase in a magnitude of axial misalignment between the opposing cores and a distance between the end surfaces of the opposing cores. For example, there exists a report describing that when the axial misalignment is 1.6 μm, an experiment in a case of connecting a single mode (SM) fiber shows the optical connection loss of 0.5 dB.

As a method to align the cores, U.S. Pat. Nos. 7,369,728, 7,447,405, and 7,889,958 propose methods for providing multiple holes in each of two optical connectors to be connected and inserting metal pins into the holes to couple the connectors together. This proposed method requires alignment between the optical connector on a optical waveguide-side (hereafter, a waveguide-side connector) having the holes and the polymer waveguide substrate.

U.S. Pat. No. 7,936,953 proposes a method for aligning the waveguide-side connector and the polymer waveguide substrate. For example, the method comprises providing positioning protrusions on a surface of the polymer waveguide substrate on which the optical waveguides are disposed and engaging the protrusions with stepped parts of the waveguide-side connector. In addition, U.S. Patent Publication No. 2012/0114280 proposes a method which comprises providing a step on a surface of the waveguide-side connector facing the polymer waveguide substrate and engaging the step with an edge of the polymer waveguide substrate to implement positioning in the depth direction.

In any of the above methods, a process for forming the holes provided in the waveguide-side connector is different from a process for forming the positioning structural portion (the stepped parts and/or the step mentioned above). Accordingly, even though a positional relationship between the holes and the cores is defined correctly, the optical waveguide cores and the optical fiber cores may be misaligned unless the cores on both sides are precisely positioned with respect to each other.

SUMMARY OF INVENTION

A possible implementation form of an embodiment according to the present disclosure provides an optical connector used for connecting an optical waveguide substrate and an optical-fiber connector member, comprising a plurality of positioning structures, each having a cylindrical hole for inserting another end of a pin which has an end inserted into the connector member, and a groove formed on a second surface perpendicular to a first surface on which an open end of the hole is located, where the groove and the hole are continuous, the groove has an arc-shaped cross section, and a center of a circle formed by a cross section of the hole and a center of an arc formed by the cross section of the groove are identical, and when the optical connector is coupled to the optical waveguide substrate that comprises a plurality of protrusions having a rectangular cross section, in each of the plurality of positioning structures, at least two corners of a corresponding protrusion among the plurality of protrusions are supported by an inner wall of the groove.

This application claims the benefit of priority to Japanese Patent Application No. 2018-053034 filed on Mar. 20, 2018, which is incorporated herein by reference in its entirety.

DESCRIPTION OF EMBODIMENTS

Figure 1:
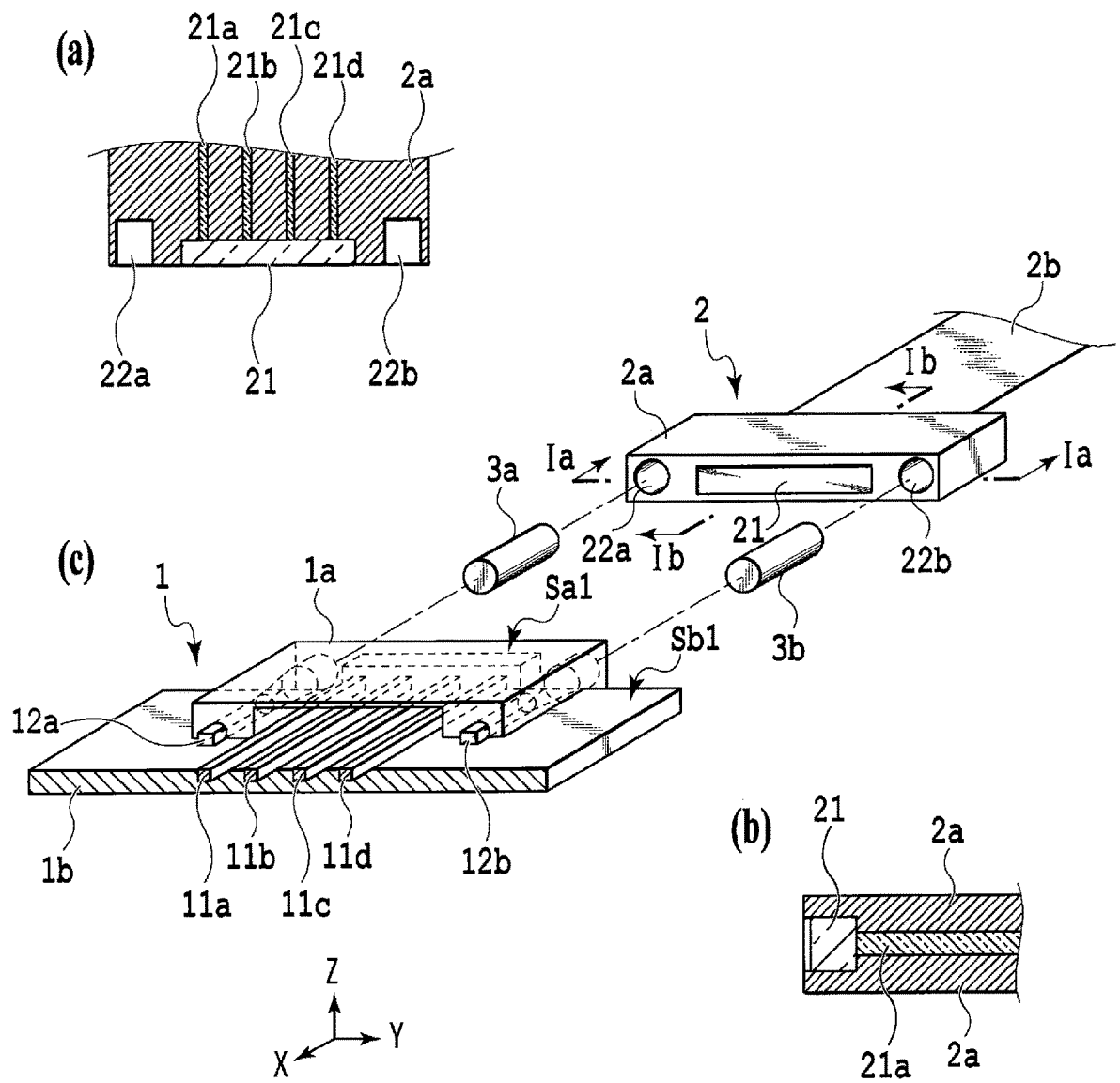
FIG. 1 shows schematic diagrams for describing a mechanism for connecting an optical waveguide unit and an optical fiber array.

Embodiments of the present disclosure will be described below with reference to the accompanying drawings. Throughout the specification and the drawings, elements with substantially like functions may be given like symbols and not be repeatedly described. For convenience of description, some components, as well as representations such as hatching, may be omitted in the drawings.

A mechanism for connecting an optical waveguide unit and an optical fiber array according to an embodiment of the present disclosure will be described with reference to FIG. 1. FIG. 1 shows diagrams for describing the mechanism for connecting an optical waveguide unit and an optical fiber array. For convenience of description, a structural body given by connecting a polymer waveguide substrate with a waveguide-side connector will hereafter be referred to as an optical waveguide unit or an optical waveguide substrate.

FIG. 1 shows an optical waveguide unit 1, an optical fiber 2, and metal pins 3a and 3b. The optical waveguide unit 1 has a waveguide-side connector 1a (e.g. a receptacle) and a polymer waveguide substrate 1b. The optical fiber 2 has a fiber-side connector 2a and an optical fiber array 2b.

In FIG. 1, dashed lines in the waveguide-side connector 1a illustrate an inner structure thereof. Although the following description takes a polymer waveguide substrate as an example for convenience of description, a positioning mechanism for the optical waveguide unit according to an embodiment of the present disclosure may also be applied to an organic substrate, a ceramic substrate, and a silicon substrate, or the like. The optical waveguides may be made of other materials, such as silicon, quartz, and a compound semiconductor.

Hereafter, a surface Sa1 and a surface Sb1 shown in FIG. 1 may be expressed as a top surface of the waveguide-side connector 1a and a top surface of the polymer waveguide substrate 1b, respectively. A surface Sat may denote a bottom surface of the waveguide-side connector 1a. The expressions "top" and "bottom" are merely used for convenience of description and not intended to limit the orientation of the optical waveguide unit 1.

Optical waveguide cores 11a, 11b, 11c, and 11d are provided on the top surface Sb1 of the polymer waveguide substrate 1b. Protrusions 12a and 12b are also formed on the top surface Sb1 of the polymer waveguide substrate 1b. The protrusions 12a and 12b are used for positioning the waveguide-side connector 1a with respect to the polymer waveguide substrate 1b. For example, the protrusions 12a and 12b may be formed with photolithography, as in forming a cladding layer on the optical waveguide cores 11a, 11b, 11c, and 11d.

Although description herein shows a case that the number of optical waveguide cores is four for convenience of description, there may be three or fewer cores, or five or more cores. The cladding layer on the optical waveguide cores 11a, 11b, 11c, and 11d will not be shown or described in detail (for example, see Richard C. A. Pitwon et. al, "Firstlight: Pluggable Optical Interconnect Technologies for Polymeric Electro-Optical Printed Circuit Boards in Data Centers", Journal of Light wave technology, vol. 30, No. 21, Nov. 1, 2012).

Multiple holes for inserting the metal pins 3a and 3b used for positioning are formed in each of the waveguide-side connector 1a and the fiber-side connector 2a. In an example of FIG. 1, an end of each of the metal pins 3a and 3b is inserted into a corresponding one of holes 22a and 22b formed in the fiber-side connector 2a. The other end of each of the metal pins 3a and 3b is inserted into a corresponding one of holes (holes 13b and 13d to be described below) in the waveguide-side connector 1a.

An end surface of a lens unit 21 is exposed on an end surface of the fiber-side connector 2a on which the open ends of the holes 22a and 22b are located. A view (a) of FIG. 1 schematically shows an Ia-Ia sectional view of the fiber-side connector 2a cut along an X-Y plane. A view (b) of FIG. 1 schematically shows an Ib-Ib sectional view of the fiber-side connector 2a cut along an X-Z plane. As shown in the views (a) and (b) of FIG. 1, the lens unit 21 includes multiple lenses, each connected to an end surface of a corresponding one of optical fiber cores 21a, 21b, 21c, and 21d.

In configuration in which the end surfaces of the optical fiber cores 21a, 21b, 21c, and 21d are directly connected with end surfaces of the optical waveguide cores 11a, 11b, 11c, and 11d, the lens unit 21 may be eliminated. Although description herein shows that the number of the optical fiber cores is four for convenience of description, there may be three or fewer cores, or five or more cores.

The holes 22a and 22b, into which the cylindrical metal pins 3a and 3b are inserted, are cylindrical and formed to have a diameter substantially the same as the diameter of the metal pins 3a and 3b. For example, the holes 22a and 22b are positioned such that the centers of the optical fiber cores 21a, 21b, 21c, and 21d are on a straight line connecting the centers of the holes 22a and 22b at their open ends. The distance from at least one of the centers of the holes 22a and 22b to each of the optical fiber cores 21a, 21b, 21c, and 21d is predetermined.

With the holes 22a and 22b configured as above, the alignment of the optical waveguide cores 11a, 11b, 11c, and 11d with the optical fiber cores 21a, 21b, 21c, and 21d is realized by positioning the optical waveguide cores 11a, 11b, 11c, and 11d with reference to the centers of the metal pins 3a and 3b. The accuracy of this alignment depends on the accuracy of the alignment between the waveguide-side connector 1a into which the metal pins 3a and 3b are inserted and the polymer waveguide substrate 1b on which the optical waveguide cores 11a, 11b, 11c, and 11d are provided.

For example, it is assumed that an X direction is the direction from the end surface of the fiber-side connector 2a toward the opposing end surface of the waveguide-side connector 1a, along the axes of the metal pins 3a and 3b.

Misalignment in the X direction creates gaps between the opposing cores, thereby causing optical connection loss. It is assumed that a Z direction is the upward direction perpendicular to the top surface Sb1 of the polymer waveguide substrate 1b, and a Y direction is the direction perpendicular to the X-Z plane. Misalignment in the Y-Z plane results in axial misalignment between the opposing cores, and the misalignment causes optical connection loss. For convenience of description, the following description may use a rectangular coordinate system defined by the above X, Y, and Z directions (an XYZ coordinate system).

To reduce optical connection loss, it is effective to increase the alignment accuracy for all the X, Y, and Z directions and the rotational directions in the X-Y plane, Y-Z plane, and Z-X plane. In this embodiment, positioning structures are provided on the bottom surface Sa2 of the waveguide-side connector 1a. The above alignment accuracy is improved by physical connection between these positioning structures and the protrusions 12a and 12b on the polymer waveguide substrate 1b.

The above positioning structures, as well as the structure of the protrusions 12a and 12b on the polymer waveguide substrate 1b, will further be described below with reference to FIGS. 2A to 6.

First, the above positioning structures formed on the bottom surface Sa2 of the waveguide-side connector 1a will be described with reference to FIGS. 2A to 3.

Figure 2A:
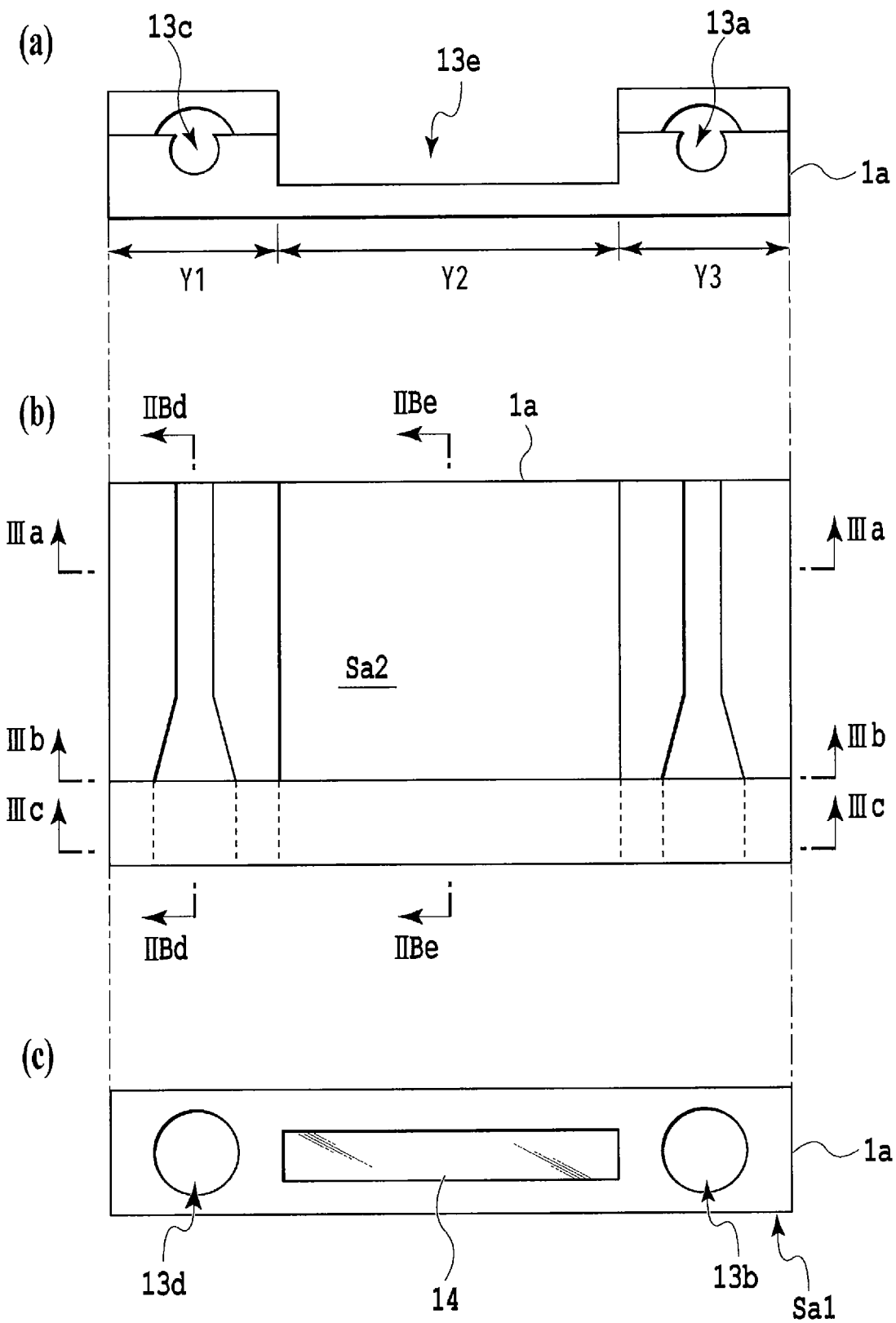
FIG. 2A shows schematic diagrams (a bottom view and side views) for describing the structure of a waveguide-side connector.
Figure 2B:
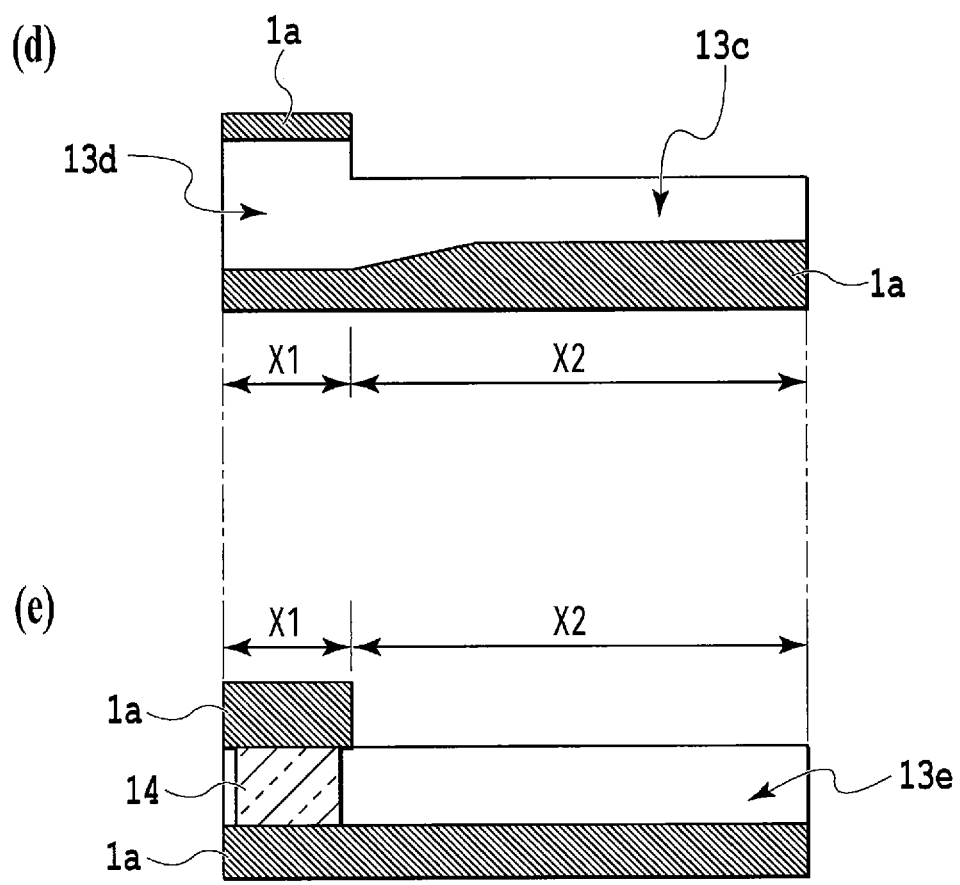
FIG. 2B shows schematic diagrams (X-Z sectional views) for describing the structure of the waveguide-side connector.

FIG. 2A shows diagrams (a bottom view and side views) for describing the structure of the waveguide-side connector. FIG. 2B shows diagrams (X-Z sectional views) for describing the structure of the waveguide-side connector. FIG. 3 shows diagrams (Y-Z sectional views) for further describing the geometries of grooves and holes in the waveguide-side connector. Dashed lines in the polymer waveguide substrate 1b in a view (b) of FIG. 2A illustrate an inner structure.

A view (a) of FIG. 2A shows the geometry of a side surface (the surface not facing the fiber-side connector 2a) of the waveguide-side connector 1a viewed along the −X direction. A view (b) of FIG. 2A shows the geometry of the bottom surface Sa2 of the waveguide-side connector 1a. A view (c) of FIG. 2A shows the geometry of a side surface (the surface facing the fiber-side connector 2a) of the waveguide-side connector 1a viewed along the X direction.

As shown in the view (b) of FIG. 2A, grooves 13a and 13c and a recess 13e are formed on the bottom surface Sa2 of the waveguide-side connector 1a. As shown in the views (a) and (b) of FIG. 2A, the recess 13e is disposed between the grooves 13a and 13c. The grooves 13a and 13c are connected to respective holes 13b and 13d shown in the view (c) of FIG. 2A.

Here, reference will be made to FIG. 3. A view (a) of FIG. 3 is a sectional view of the waveguide-side connector 1a cut along a line IIIc-IIIa in the view (b) of FIG. 2A. A view (b) of FIG. 3 is a sectional view of the waveguide-side connector 1a cut along a line IIIb-IIIb in the view (b) of FIG. 2A. A view (c) of FIG. 3 is a sectional view of the waveguide-side connector 1a cut along a line IIIc-IIIc in the view (b) of FIG. 2A.

Figure 3:
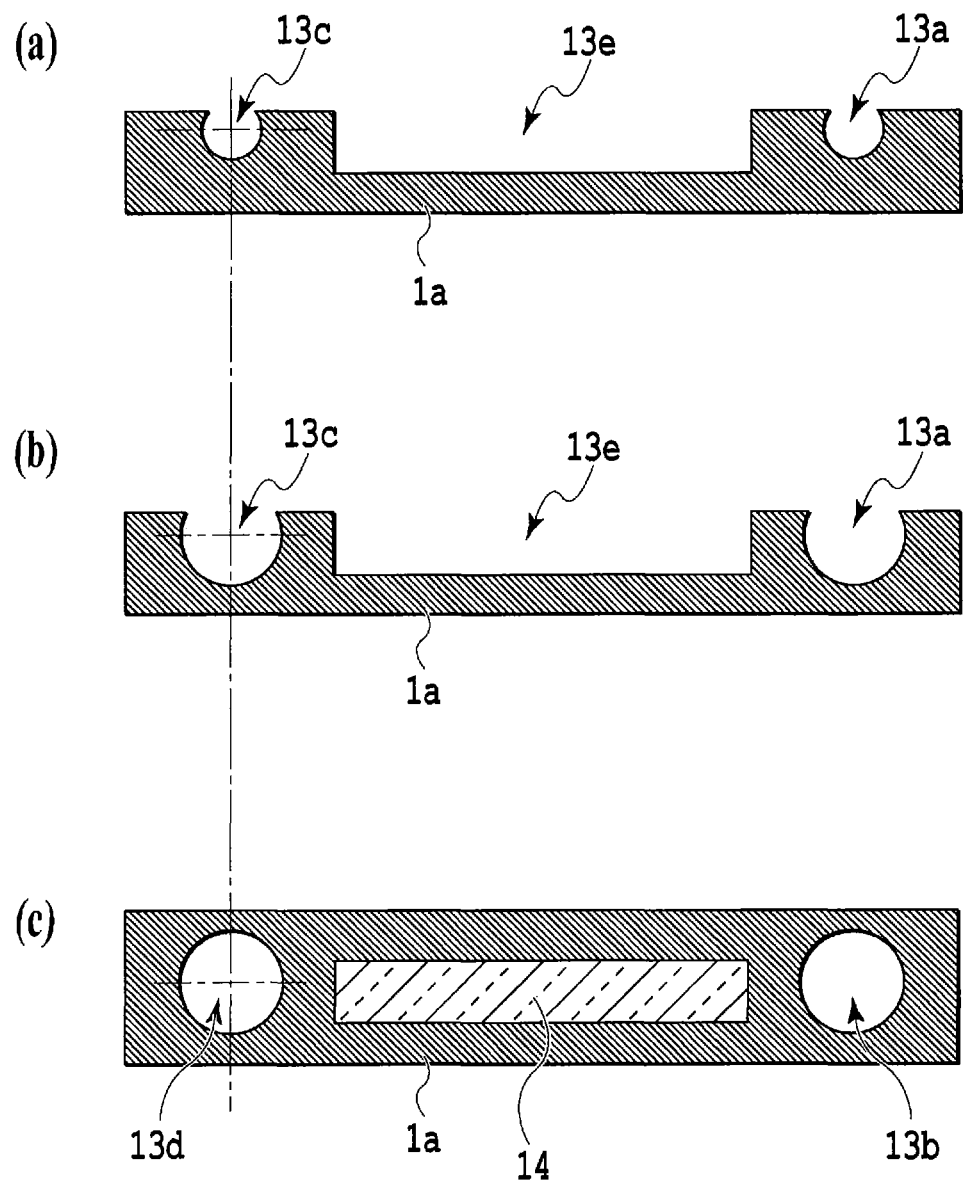
FIG. 3 shows schematic diagrams (Y-Z sectional views) for further describing the geometries of grooves and holes in the waveguide-side connector.

As shown in the view (a) of FIG. 2A and the views (a) and (b) of FIG. 3, the grooves 13a and 13c are arc-shaped in cross section (Y-Z cross section). As shown in the view (b) of FIG. 2A and a view (d) of FIG. 2B, the holes 13b and 13d penetrate through the waveguide-side connector 1a while connected to the respective grooves 13a and 13c at the line IIIb-IIIb. The holes 13b and 13d have a size corresponding to the size of the metal pins 3a and 3b.

As shown in the views (a)-(c) of FIG. 3, the arc corresponding to the groove 13c is concentric with the circle corresponding to the hole 13d. That is, the positioning structure is coaxially produced. Coaxially producing the positioning structure realizes high positioning accuracy and further provides advantages such as a simple and convenient product test.

The groove 13c and the hole 13d may be coaxially formed without relying on the height h from the top surface Sa1 of the waveguide-side connector 1a to the axis, or the distance u from a side surface of the waveguide-side connector 1a to the axis. Then, high positioning accuracy is realized, and advantages such as a simple and convenient product test are further provided. The groove 13a and the hole 13b are also structured in a similar manner.

Here, reference will be made to the view (d) of FIG. 2B. The view (d) of FIG. 2B is a sectional view of the waveguide-side connector 1a cut along a line IIBd-IIBd in the view (b) of FIG. 2A. As shown in the view (d) of FIG. 2B, the hole 13d connects to the groove 13c at the IIIb-IIIb line and penetrates through the waveguide-side connector 1a. The hole 13b is also structured in a similar manner.

As shown in the view (b) of FIG. 2A and the view (d) of FIG. 2B, the groove 13c includes a section in which the width and the depth are constant (a section with a constant arc radius; hereafter referred to as a uniform-width section). The groove 13c also includes a section in which the width and the depth increase to form a tapered shape from the uniform-width section to a connecting portion to be connected with the hole 13d (a section with an increasing arc radius; hereafter referred to as a tapered section). The groove 13a is also structured in a similar manner.

The grooves 13a and 13c and the holes 13b and 13d have the structures as described above.

The recess 13e is a structural portion for avoiding the optical waveguide cores 11a, 11b, 11c, and 11d from contacting the bottom surface Sa2 of the waveguide-side connector 1a when the waveguide-side connector 1a and the polymer waveguide substrate 1b are connected. The depth of the recess 13e is set to be equal to or greater than the height of the optical waveguide cores 11a, 11b, 11c, and 11d plus the height of the cladding layer on the cores (the height in the Z direction from the top surface Sb1 of the polymer waveguide substrate 1b).

A view (e) of FIG. 2B is a sectional view of the waveguide-side connector 1a cut along a line IIBe-IIBe in the view (b) of FIG. 2A. As shown in the view (c) of FIG. 2A and the view (e) of FIG. 2B, in this example, a lens unit 14 is provided near the end surface of the waveguide-side connector 1a facing the fiber-side connector 2a. The lens unit 14 includes lenses at positions corresponding to the ends of the optical waveguide cores 11a, 11b, 11c, and 11d, and adjusts the paths of light that is input to the ends or output from the ends.

As shown in the views (d) and (e) of FIG. 2B, the waveguide-side connector 1a has different thicknesses (heights in the Z direction) in a section X1 corresponding to the grooves 13a and 13c and in a section X2 corresponding to the holes 13b and 13d. This forms a step at the boundary between the sections X1 and X2.

Figure 4:
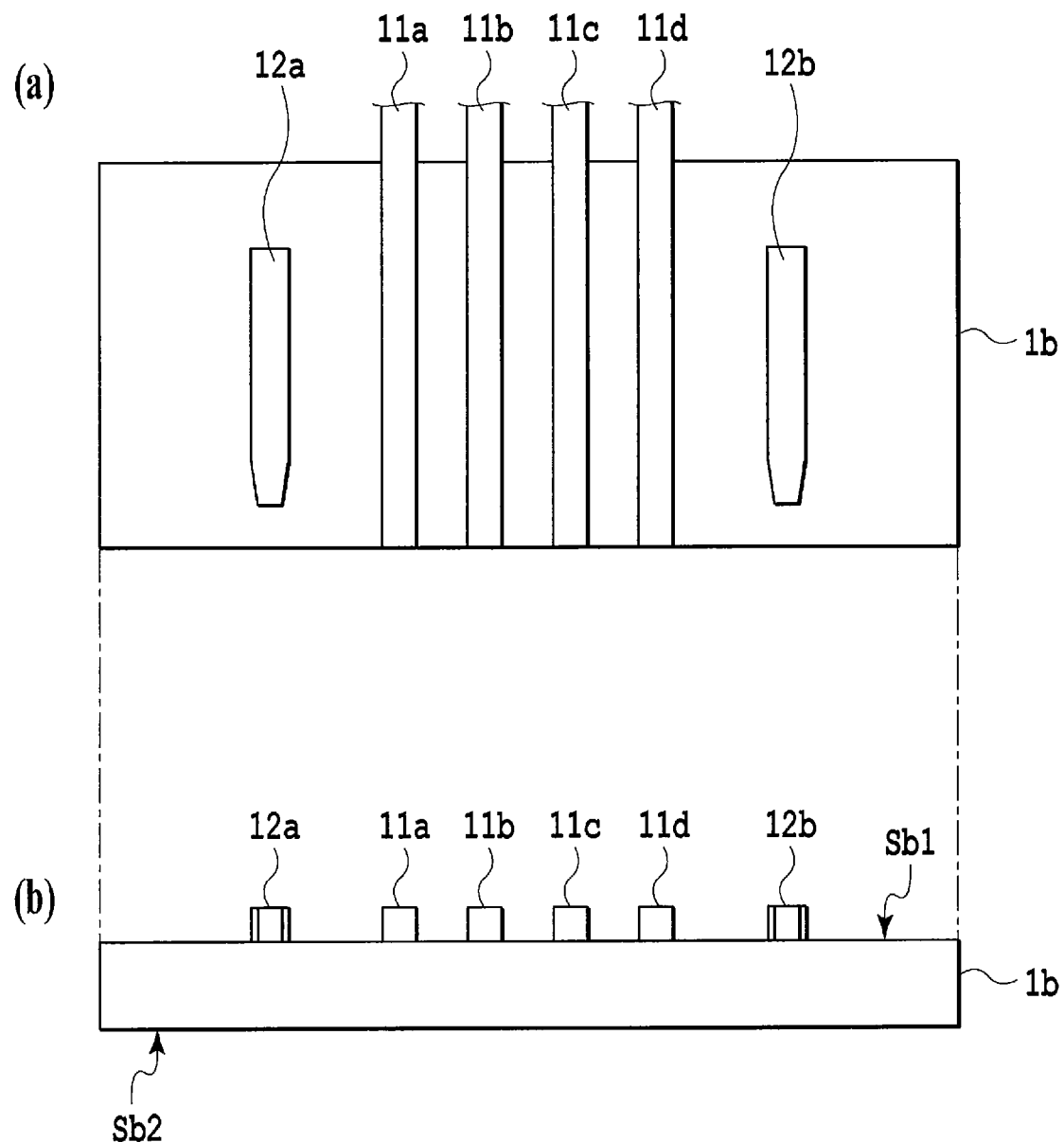
FIG. 4 shows schematic diagrams (a top view and a side view) for describing the geometries of a polymer waveguide substrate and protrusions formed thereon.

Now, the geometry of the protrusions 12a and 12b formed on the top surface Sb1 of the polymer waveguide substrate 1b will be described with reference to FIG. 4. FIG. 4 shows diagrams (a top view and a side view) for describing the geometries of the polymer waveguide substrate and the protrusions formed thereon.

A view (a) of FIG. 4 shows the geometry of the top surface Sb1 of the polymer waveguide substrate 1b. A view (b) of FIG. 4 shows the geometry of a side surface of the polymer waveguide substrate 1b viewed along the X direction. As shown in the view (a) of FIG. 4, the protrusions 12a and 12b are formed on the top surface Sb1 of the polymer waveguide substrate 1b, and the optical waveguide cores 11a, 11b, 11c, and 11d are provided between the protrusions 12a and 12b.

For example, the protrusions 12a and 12b are formed along the X direction. The protrusions 12a and 12b are formed to be spaced apart at the same distance as the grooves 13a and 13c. The protrusions 12a and 12b are formed with a height (a height in the Z direction from the top surface Sb1 of the polymer waveguide substrate 1b) that is the same as the optical waveguide cores 11a, 11b, 11c, and 11d.

The protrusions 12a and 12b are formed with a width (a length in the Y direction) substantially the same as the opening width of the arcs formed by the cross sections of the grooves 13a and 13c. For example, the opening width of the arcs corresponds to the distance between the two points at which the bottom surface Sa2 of the waveguide-side connector 1a and the arc of the groove 13c shown in the view (a) of FIG. 3 intersect. The width of the protrusions 12a and 12b may be determined based on the opening width of the arcs of the grooves 13a and 13c in the uniform-width section.

For convenience of description, the protrusions and their corresponding grooves are shown with the same width. However, the width of the protrusions and the width of their corresponding grooves may be different due to an error occurring in a production process or due to a clearance allowed for the groove width in order to facilitate fitting. Such a difference in width is to be expected by those skilled in the art and is within the technical scope of this embodiment.

As shown in the view (a) of FIG. 4, a tip part of each of the protrusions 12a and 12b closer to the surface in the view (b) of FIG. 4 is tapered so that the width gradually decreases. Tapering the tip part of each of the protrusions 12a and 12b facilitates the fitting of the protrusions 12a and 12b into the grooves 13a and 13c in connecting the waveguide-side connector 1a and the polymer waveguide substrate 1b.

Figure 5:
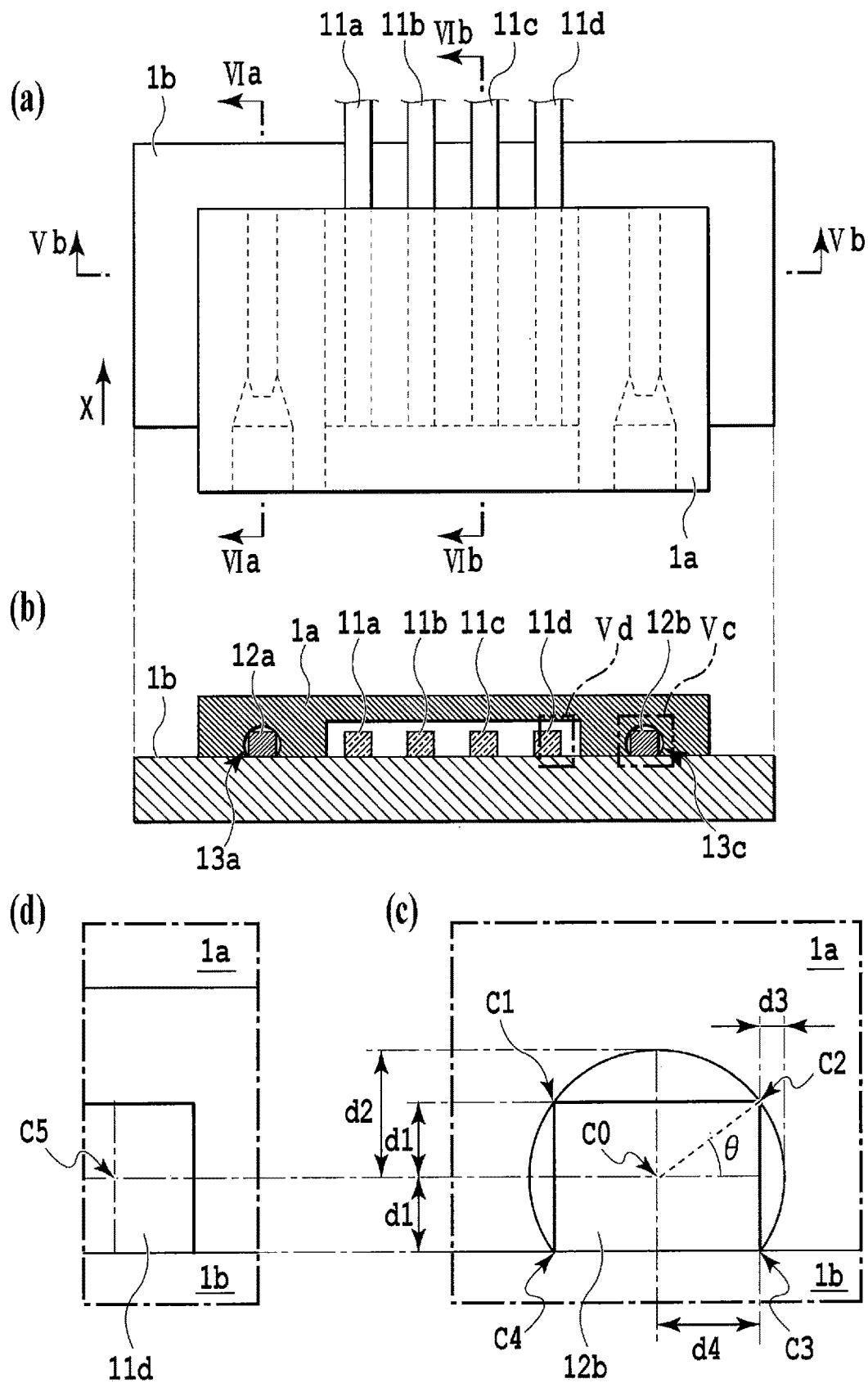
FIG. 5 shows schematic diagrams (a top view, a Y-Z sectional view, and enlarged sectional views) for describing the structure of the optical waveguide unit in which the polymer waveguide substrate and the waveguide-side connector are connected together.

Connecting the waveguide-side connector 1a and the polymer waveguide substrate 1b results in a state as shown in a view (a) of FIG. 5. FIG. 5 shows diagrams (a top view, a Y-Z sectional view, and enlarged sectional views) for describing the structure of the optical waveguide unit in which the polymer waveguide substrate and the waveguide-side connector are connected together.

The view (a) of FIG. 5 is a top view of the optical waveguide unit 1 in which the polymer waveguide substrate 1b and the waveguide-side connector 1a are connected together. Dashed lines in the top surface Sa1 of the waveguide-side connector 1a in the view (a) of FIG. 5 illustrate an inner structure.

An exemplary method of connection is as follows. While the top surface Sb1 of the polymer waveguide substrate 1b is kept in contact with the bottom surface Sat of the waveguide-side connector 1a, the waveguide-side connector 1a is slid in the X direction so that the tip parts of protrusions 12a and 12b (see the view (b) of FIG. 4) is slipped into the openings of the grooves 13a and 13c (see the view (a) of FIG. 2A). According to this method, the tapered tip parts of the protrusions 12a and 12b allow easier connection between the waveguide-side connector 1a and the polymer waveguide substrate 1b.

A view (b) of FIG. 5 shows a cross sectional geometry of the optical waveguide unit 1 cut along a line Vb-Vb in the view (a) of FIG. 5. As shown in the view (b) of FIG. 5, the protrusions 12a and 12b are fitted into the respective grooves 13a and 13c in the waveguide-side connector 1a. The optical waveguide cores 11a, 11b, 11 c, and 11d are disposed inside the recess 13e in the waveguide-side connector 1a.

Here, the geometries of the protrusion 12b and the groove 13c will further be described with reference to a view (c) of FIG. 5. The view (c) of FIG. 5 an enlarged view of the area around the groove 13c with the protrusion 12b fitted therein. For ease of viewing, the view (c) of FIG. 5 is not hatched.

For convenience of description, the view (c) of FIG. 5 shows the center C0 of the arc formed by the cross section of the groove 13c, and contact points C1, C2, C3, and C4 at which the groove 13c contacts the protrusion 12b. The contact points C3 and C4 are the end points of the arc. For convenience of description, the view (c) of FIG. 5 shows parameters such as the height of the protrusion 12b (d1×2), the radius of the arc (d2), space between the protrusion 12b and the side wall of the groove 13c (d3), and the width of the protrusion 12b (d4×2).

As shown in the view (c) of FIG. 5, the protrusion 12b supports the inner wall of the groove 13c at the two contact points C1 and C2 at least. Similarly, the protrusion 12a, which is rectangular in cross section, supports the inner wall of the groove 13a at the two corners corresponding to the contact points C1 and C2 among the four corners of the protrusion 12a. The protrusions 12a and 12b, therefore, support the waveguide-side connector 1a at four corners at least.

Because the protrusions 12a and 12b support the grooves 13a and 13c at four corners at least, the positional relationship between the grooves 13a and 13c and the protrusions 12a and 12b can be fixed for the Y and Z directions and for the rotational directions in the X-Y plane, Y-Z plane, and Z-X plane.

As shown in the view (c) of FIG. 5, when the two points on the rectangle (the contact points C1 and C2) contact the inner wall of the arc, the center of the rectangle coincides with the center C0 of the arc. The distance from the base of the rectangle to its center is half the height of the rectangle.

In the example in the view (c) of FIG. 5, the center C0 of the arc is located at the height d1, which is half the height of the protrusion 12b (d1×2). That is, if the cross-sectional center of the protrusion 12b and the center (hereafter referred to as a core center) of each of the optical waveguide cores 11a, 11b, 11c, and 11d have the same height d1 (see the views (c) and (d) of FIG. 5), the distance from the top surface Sb1 of the polymer waveguide substrate 1b to the core center is equal to the distance from the top surface Sb1 to the cross-sectional center (the center of the arc) of the groove 13c.

The cross-sectional centers of the grooves 13a and 13c align with the respective cross-sectional centers of the holes 13b and 13d corresponding to the respective central axes of the metal pins 3a and 3b. Therefore, the positional relationship of the central axes of the metal pins 3a and 3b with the core centers can be readily aligned. Using photolithography for forming the protrusions 12a and 12b allows alignment of the core centers with the cross-sectional centers of the protrusions 12a and 12b with a accuracy of less than 0.1 µm.

As an example, evaluation was performed under the conditions of the height 7 µm of the optical waveguide cores 11a, 11b, 11c, and 11d, d1=3.5 μm, d2=40 μm, d3=0.2 μm, d4=39.8 μm, and θ=5° (see the view (c) of FIG. 5 for the angle θ). According to the result of the evaluation, applying the positioning mechanism in this embodiment is expected to provide a desirable accuracy. The above numerical conditions are exemplary, and the numerical ranges may be appropriately changed according to implementations. The technical scope of this embodiment is not limited to this example.

Figure 6:
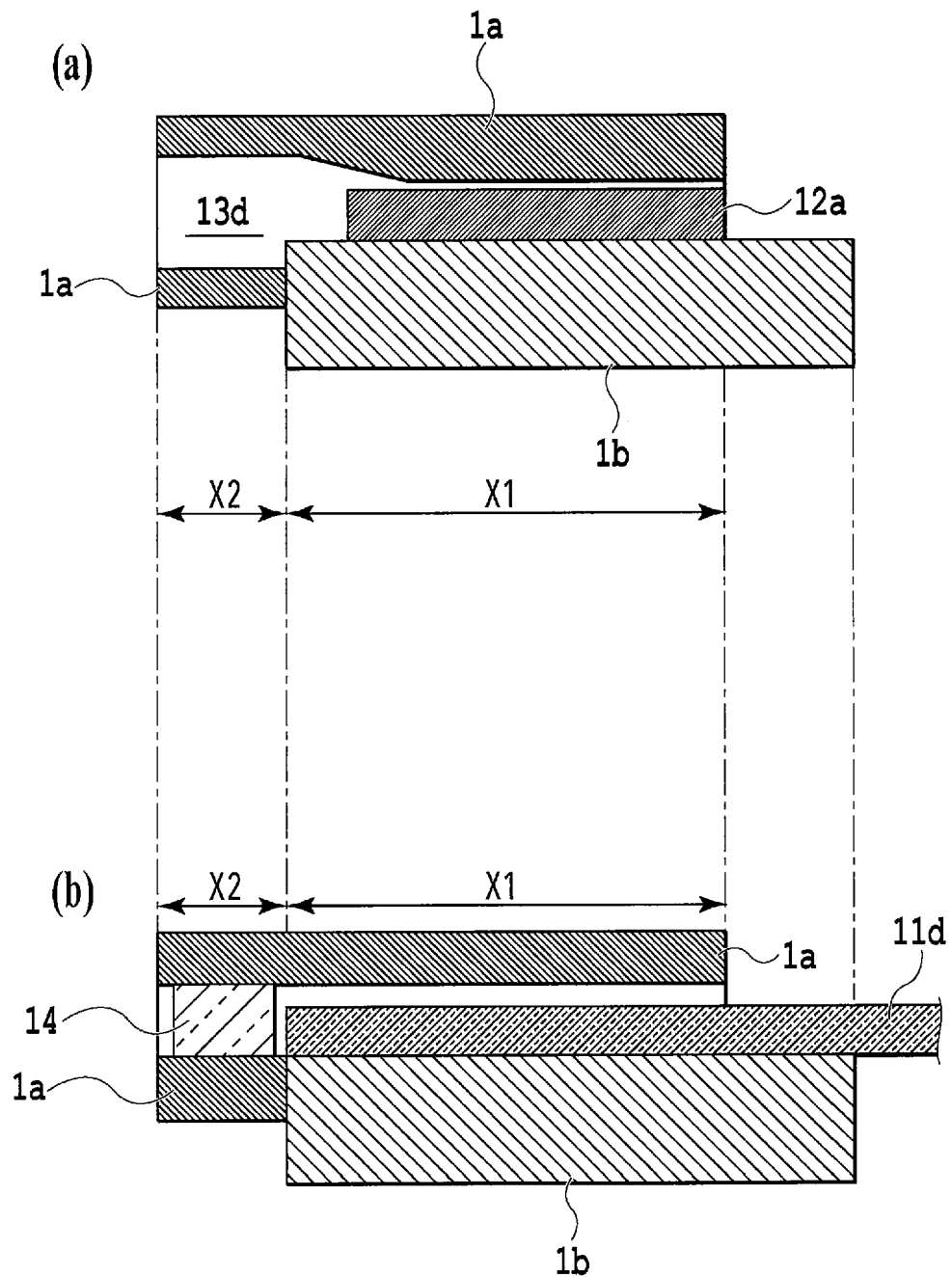
FIG. 6 shows schematic diagrams (X-Z sectional views) for further describing the structure of the optical waveguide unit in which the polymer waveguide substrate and the waveguide-side connector are connected together.

Positioning in the X direction is achieved using the step provided between the sections X1 and X2 in the waveguide-side connector 1a. The positioning in the X direction will be described here with reference to FIG. 6. FIG. 6 shows diagrams (X-Z sectional views) for further describing the structure of the optical waveguide unit in which the polymer waveguide substrate and the waveguide-side connector are connected together.

A view (a) of FIG. 6 shows a cross-sectional geometry of the optical waveguide unit 1 cut along a line VIa-VIa in the view (a) of FIG. 5. A view (b) of FIG. 6 shows a cross-sectional geometry of the optical waveguide unit 1 cut along a line VIb-VIb in the view (a) of FIG. 5.

As described above, if the waveguide-side connector 1a is connected to the polymer waveguide substrate 1b, the protrusion 12a is disposed inside the groove 13a (see the view (a) of FIG. 6), and the optical waveguide cores 11a, 11b, 11c, and 11d are disposed inside the recess 13e (see the view (b) of FIG. 6). The section X2 includes the hole 13b continuing to the groove 13a (see the view (a) of FIG. 6), and the lens unit 14 (see the view (b) of FIG. 6).

While the substrate and the connector are connected as above, in the section X1, the bottom surface Sa2 of the waveguide-side connector 1a contacts the top surface Sb1 of the polymer waveguide substrate 1b. In the section X2, which is thicker than the section X1, the step at the boundary between the sections X1 and X2 abuts against and engages with an edge part of the polymer waveguide substrate 1b (the part corresponding to the surface facing the fiber-side connector 2a). This restricts movements of the waveguide-side connector 1a in the X direction.

The end surfaces of the optical waveguide cores 11a, 11b, 11c, and 11d may be aligned with the edge part of the polymer waveguide substrate 1b (see the view (a) of FIG. 4), and the lens unit 14 may be designed to be located near the step (see the view (e) of FIG. 2B). Then, the alignment in the X direction can be readily achieved as shown in the view (b) of FIG. 6. The lens unit 14 may be eliminated in a variation, which will be described below. For the mechanism for achieving the alignment in the X direction, different variations are possible. These variations will now be described.

Figure 7:
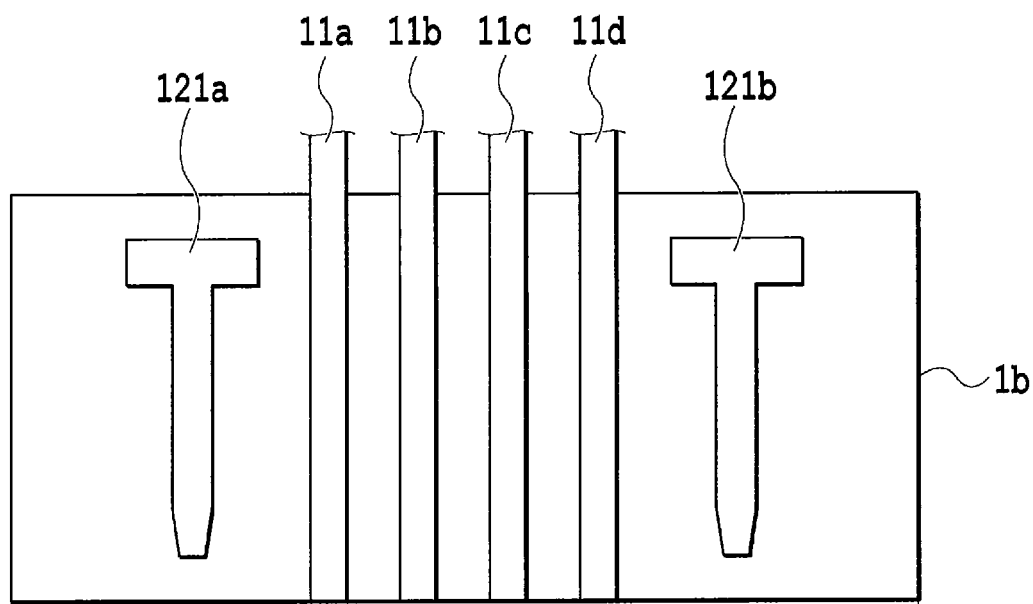
FIG. 7 shows schematic diagrams (a top view and a side view) for describing the geometries of the polymer waveguide substrate and the protrusions formed thereon, according to a first variation.
Figure 7:
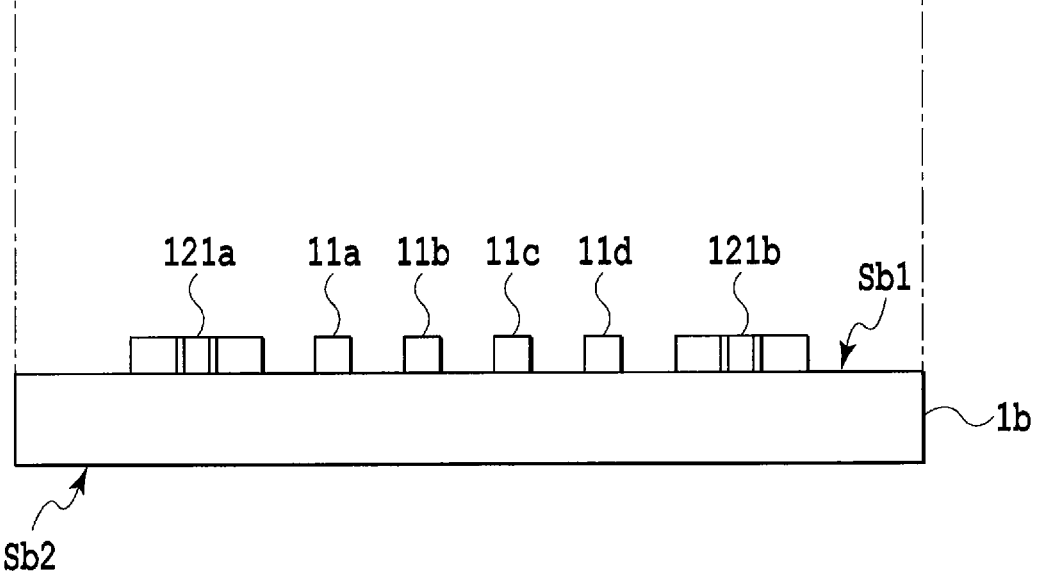

(First variation) First, reference will be made to FIG. 7. FIG. 7 shows diagrams (a top view and a side view) for describing the geometries of the polymer waveguide substrate and the protrusions formed thereon, according to a first variation. A view (a) of FIG. 7 shows the geometry of the top surface Sb1 of the polymer waveguide substrate 1b. A view (b) of FIG. 7 shows the geometry of the side surface of the polymer waveguide substrate 1b viewed along the X direction.

As shown in the view (a) of FIG. 7, protrusions 121a and 121b are formed on the top surface Sb1 of the polymer waveguide substrate 1b, and the optical waveguide cores 11a, 11b, 11c, and 11d are provided between the protrusions 121a and 121b. A difference from the positioning mechanism shown in the view (a) of FIG. 4 is in the shape of the protrusions 121a and 121b.

As shown in the view (a) of FIG. 7, each of the protrusions 121a and 121b has its tip part (the end closer to the side surface in a view (b) of FIG. 7) tapered as with the protrusions 12a and 12b shown in the view (a) of FIG. 4. Each of the protrusions 121a and 121b also has a uniform-width section in which the width is constant (a section that fits into the uniform-width section of the corresponding one of the grooves 13a and 13c). Further, each of the protrusions 121a and 121b has, in its terminal part, a section wider than the uniform-width section (hereafter referred to as a wider section), thereby having a T-shape as a whole.

Assume that the positioning mechanism in FIG. 7 is applied and the waveguide-side connector 1a is connected to the polymer waveguide substrate 1b as in the example in FIG. 5. The side surface of the waveguide-side connector 1a corresponding to the view (a) of FIG. 2A (the surface not facing the fiber-side connector 2a) abuts against side surfaces of the wider sections, thereby restricting movements of the waveguide-side connector 1a in the X direction.

As described above, movements of the waveguide-side connector 1a in the X direction can be restricted using the step provided on the waveguide-side connector 1a. The protrusions 121a and 121b can be finely produced with, for example, photolithography. Applying the mechanism in the first variation shown in FIG. 7 can therefore increase the positioning accuracy in the X direction.

Figure 8:
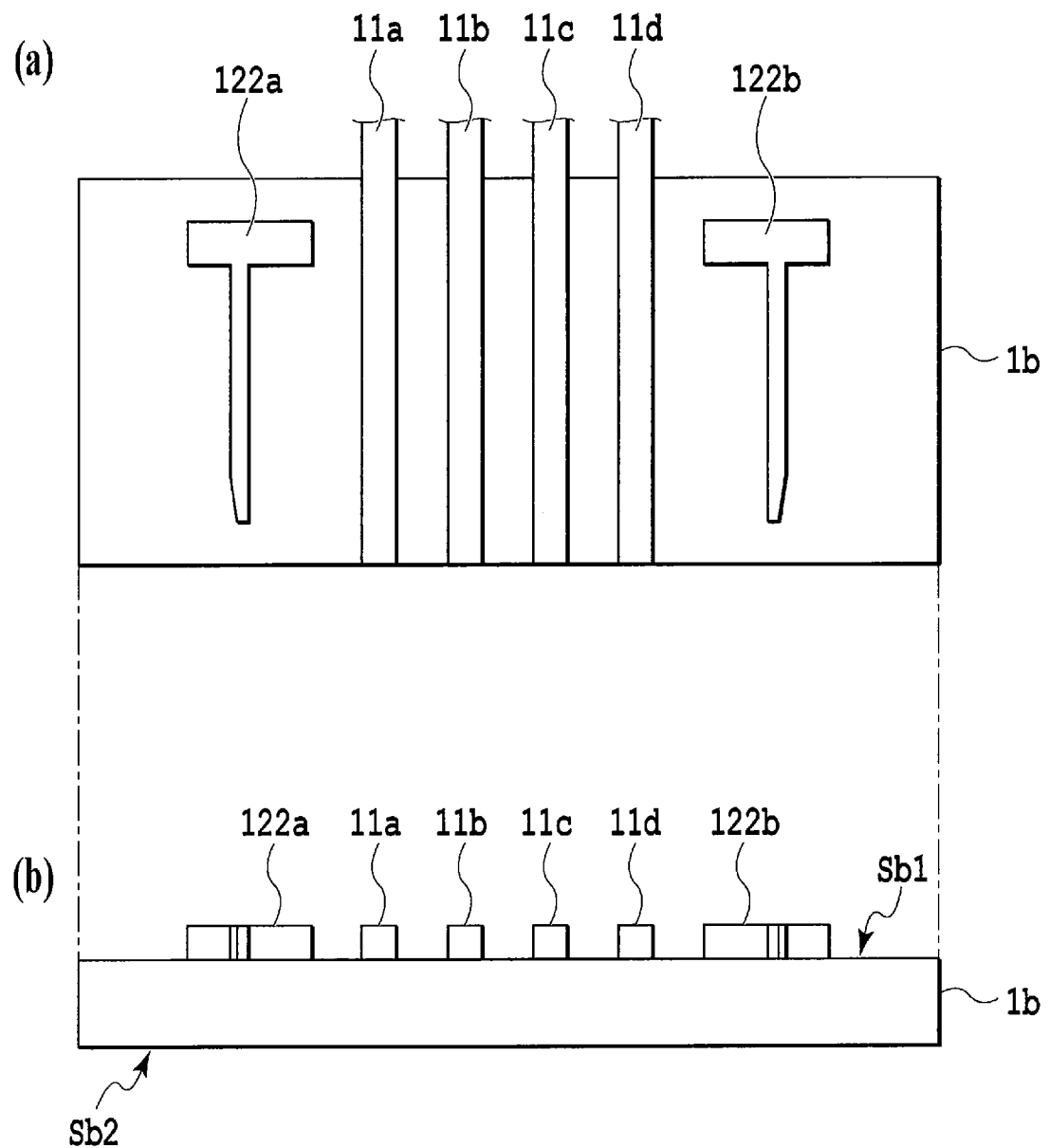
FIG. 8 shows schematic diagrams (a top view and a side view) for describing the geometries of the polymer waveguide substrate and the protrusions formed thereon, according to a second variation.

(Second variation) Now, reference will be made to FIG. 8. FIG. 8 shows diagrams (a top view and a side view) for describing the geometries of the polymer waveguide substrate and the protrusions formed thereon, according to a second variation. A view (a) of FIG. 8 shows the geometry of the top surface Sb1 of the polymer waveguide substrate 1b. A view (b) of FIG. 8 shows the geometry of the side surface of the polymer waveguide substrate 1b viewed along the X direction.

As shown in the view (a) of FIG. 8, protrusions 122a and 122b are formed on the top surface Sb1 of the polymer waveguide substrate 1b, and the optical waveguide cores 11a, 11b, 11c, and 11d are provided between the protrusions 122a and 122b. A difference from the positioning mechanism shown in the view (a) of FIG. 7 is in the shape of the protrusions 122a and 122b.

The protrusion 122a has its terminal part structured in the same manner as the protrusion 121a. The protrusion 122a is different from the protrusion 121a in the shape of the uniform-width section and tip part. The uniform-width section of the protrusion 122a has a structure such that approximately half of the uniform-width section of the protrusion 121a closer to the optical waveguide core 11a is eliminated.

Similarly, the protrusion 122b has its terminal part structured in the same manner as the protrusion 121b. The protrusion 122b is different from the protrusion 121b in the shape of the uniform-width section and tip part. The uniform-width section of the protrusion 122b has a structure such that half of the uniform-width section of the protrusion 121b closer to the optical waveguide core 11d is eliminated. Eliminating half of the uniform-width section in this manner facilitates inserting the protrusions 122a and 122b into the grooves 13a and 13c.

Assume that the positioning mechanism in FIG. 8 is applied and the waveguide-side connector 1a is connected to the polymer waveguide substrate 1b as in the example in FIG. 5. The protrusions 122a and 122b contact the inner walls of the grooves 13a and 13c at fewer contact points. For example, the protrusion 122b contacts the inner wall of the groove 13c at the contact points C2 and C3.

As above, applying the mechanism of the second variation shown in FIG. 8 reduces the number of contact points at which the protrusions 122a and 122b contact the grooves 13a and 13c. However, sufficient positioning accuracy is provided because the corners on the top surfaces of the protrusions 122a and 122b support the respective grooves 13a and 13c. Further, the connection of the waveguide-side connector 1a to the polymer waveguide substrate 1b is advantageously facilitated.

Figure 9:
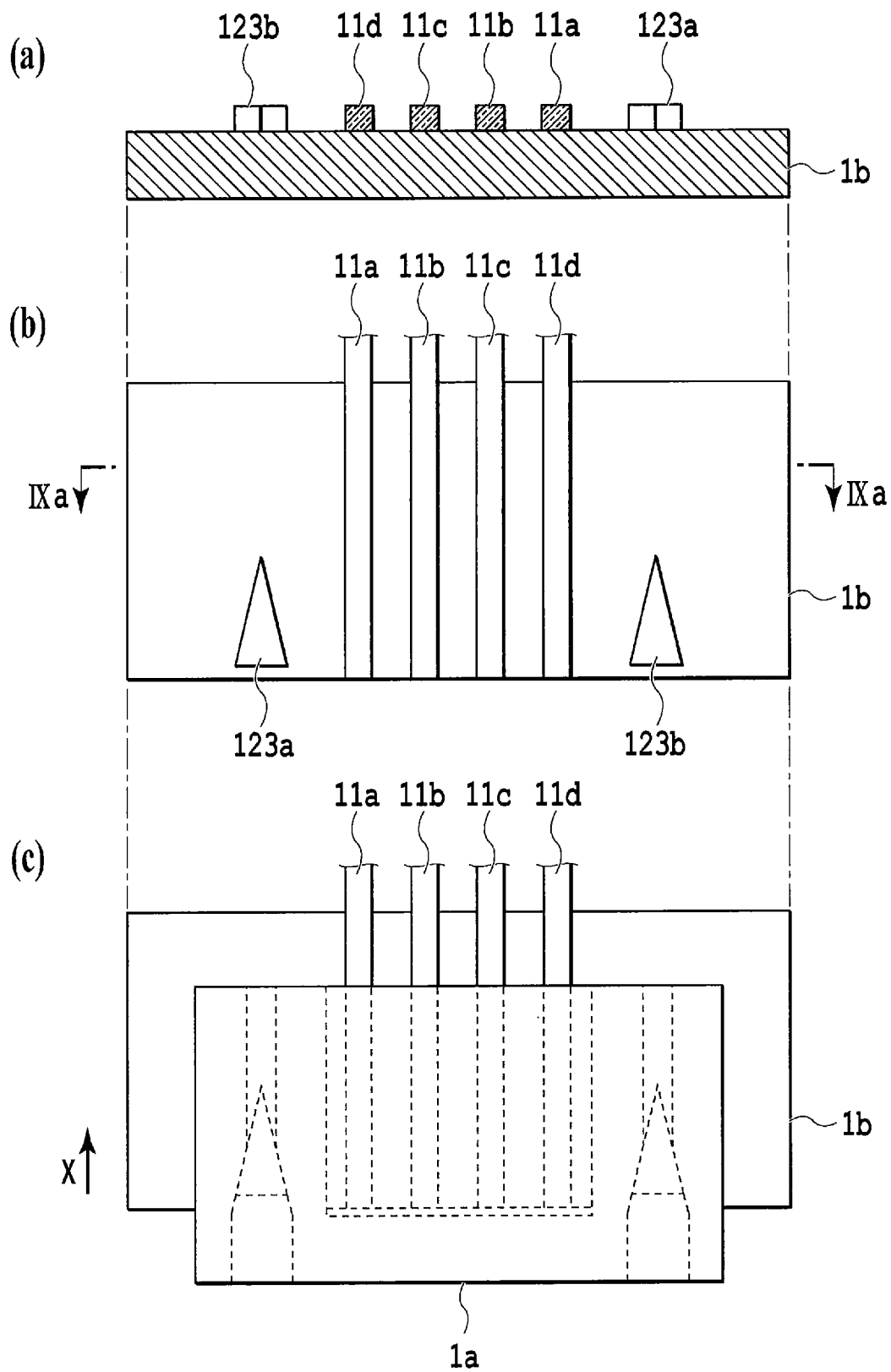
FIG. 9 shows schematic diagrams (a top view, a Y-Z sectional view, and a connected-state view) for describing the geometries of the polymer waveguide substrate and the protrusions formed thereon, according to a third variation.

(Third variation) Now, reference will be made to FIG. 9. FIG. 9 shows diagrams (a top view, a Y-Z sectional view, and a connected-state view) for describing the geometries of the polymer waveguide substrate and the protrusions formed thereon, according to a third variation.

A view (a) of FIG. 9 shows the geometry of a cross section of the polymer waveguide substrate 1b (a cross section of the polymer waveguide substrate 1b cut along a line IXa-IXa in a view (b) of FIG. 9) viewed along the −X direction. The view (b) of FIG. 9 shows the geometry of the top surface Sb1 of the polymer waveguide substrate 1b. A view (c) of FIG. 9 is a top view of the optical waveguide unit 1 in which the polymer waveguide substrate 1b in the views (a) and (b) of FIG. 9 and the waveguide-side connector 1a are connected together. Dashed lines in the top surface Sa1 of the waveguide-side connector 1a in the view (c) of FIG. 9 illustrate an inner structure.

As shown in the view (b) of FIG. 9, protrusions 123a and 123b are formed on the top surface Sb1 of the polymer waveguide substrate 1b, and the optical waveguide cores 11a, 11b, 11c, and 11d are provided between the protrusions 123a and 123b. A difference from the positioning mechanism shown in the view (a) of FIG. 4 is in the shape of the protrusions 123a and 123b.

As shown in the view (b) of FIG. 9, each of the protrusions 123a and 123b is isosceles-triangular with its vertex oriented in the X direction, when viewed from above (when viewed along the −Z direction). The protrusions 123a and 123b have the same height as the protrusions 12a and 12b shown in the view (a) of FIG. 4 (a uniform thickness in the Z direction) (see the view (a) of FIG. 9). Therefore, the cross section of each of the protrusions 123a and 123b cut along the Y-Z plane is rectangular.

Each of the protrusions 123a and 123b has a tip part corresponding to the vertex of the isosceles triangle, and a terminal part corresponding to the base of the isosceles triangle. The width of the terminal part, corresponding to the length of the base, is wider than the width of the uniform-width sections of the grooves 13a and 13c. Therefore, if the waveguide-side connector 1a is slid in the −X direction to fit the protrusions 123a and 123b into the grooves 13a and 13c, the protrusions 123a and 123b engage with the respective tapered sections of the grooves 13a and 13c, as shown in the view (c) of FIG. 9.

Because the protrusions 123a and 123b engage with the respective tapered sections of the grooves 13a and 13c, movements of the waveguide-side connector 1a in the −X direction are restricted. In applying the mechanism shown in FIG. 9, the protrusions 123a and 123b, which are rectangular in Y-Z cross section, still abut against the respective inner walls of the grooves 13a and 13c at the contact points C1, C2, C3, and C4 (see the view (c) of FIG. 5) and support the waveguide-side connector 1a.

As above, applying the mechanism of the third variation shown in FIG. 9 allows the inner walls of the grooves 13a and 13c to be supported at the contact points C1, C2, C3, and C4 as in the mechanism shown in FIG. 5. The engagement of the protrusions 123a and 123b with the tapered sections also allows the positioning in the X direction, so that high positioning accuracy is realized for all the directions. Further, the connection of the waveguide-side connector 1a to the polymer waveguide substrate 1b is advantageously facilitated.

Figure 10:
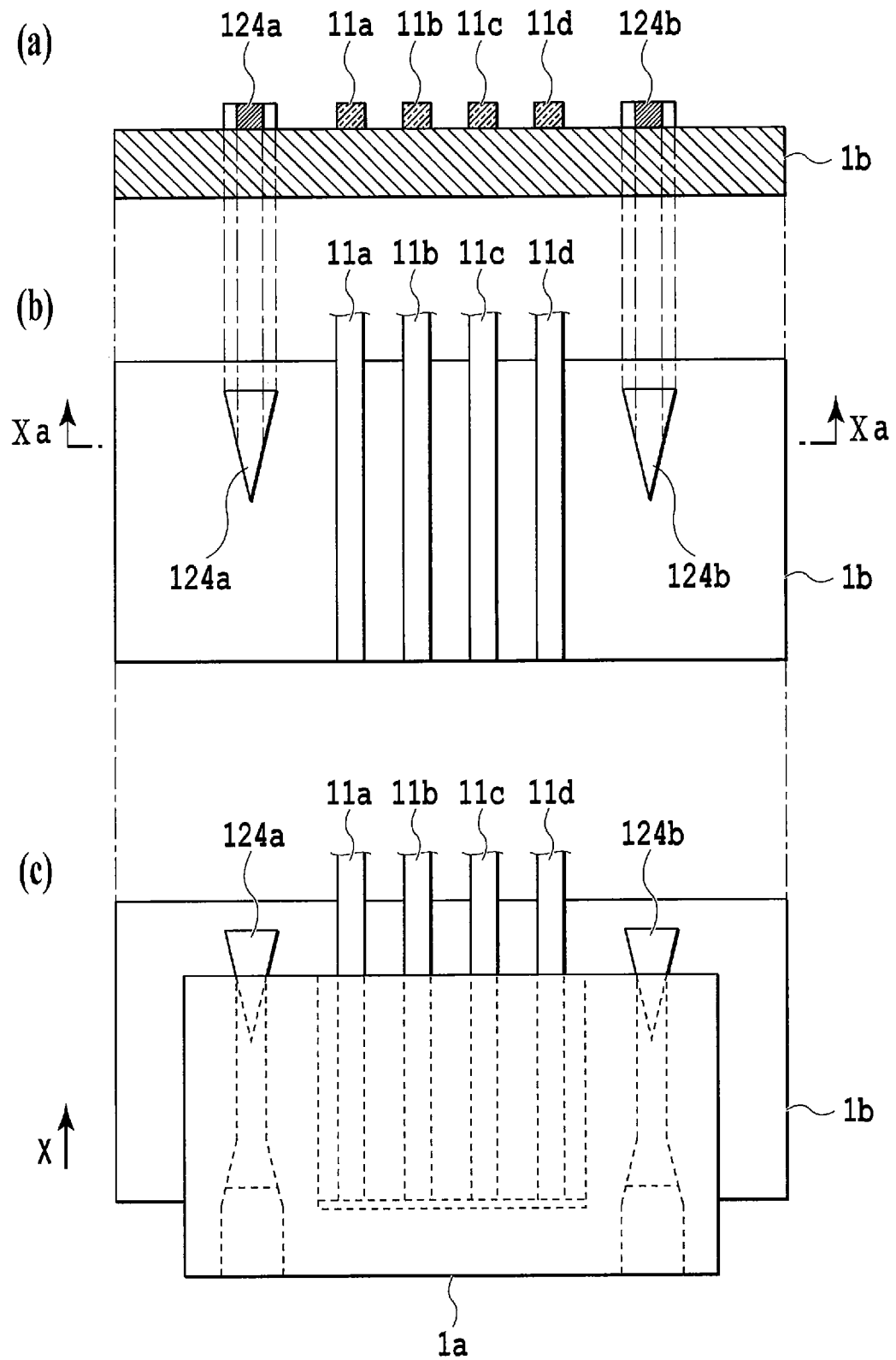
FIG. 10 shows schematic diagrams (a top view, a Y-Z sectional view, and a connected-state view) for describing the geometries of the polymer waveguide substrate and the protrusions formed thereon, according to a fourth variation.

(Fourth variation) Now, reference will be made to FIG. 10. FIG. 10 shows diagrams (a top view, a Y-Z sectional view, and a connected-state view) for describing the geometries of the polymer waveguide substrate and the protrusions formed thereon, according to a fourth variation.

A view (a) of FIG. 10 shows the geometry of a cross section of the polymer waveguide substrate 1b (a cross section of the polymer waveguide substrate 1b cut along a line Xa-Xa in a view (b) of FIG. 10) viewed along the −X direction. The view (b) of FIG. 10 shows the geometry of the top surface Sb1 of the polymer waveguide substrate 1b. A view (c) of FIG. 10 is a top view of the optical waveguide unit 1 in which the polymer waveguide substrate 1b in the views (a) and (b) of FIG. 10 and the waveguide-side connector 1a are connected together. Dashed lines in the top surface Sa1 of the waveguide-side connector 1a in the view (c) of FIG. 10 illustrate an inner structure.

As shown in the view (b) of FIG. 10, protrusions 124a and 124b are formed on the top surface Sb1 of the polymer waveguide substrate 1b, and the optical waveguide cores 11a, 11b, 11c, and 11d are provided between the protrusions 124a and 124b. A difference from the positioning mechanism shown in the view (a) of FIG. 4 is in the shape of the protrusions 124a and 124b.

As shown in the view (b) of FIG. 10, each of the protrusions 124a and 124b is isosceles-triangular with its vertex oriented in the −X direction, when viewed from above (when viewed along the −Z direction). The protrusions 124a and 124b have the same height as the protrusions 12a and 12b shown in the view (a) of FIG. 4 (a uniform thickness in the Z direction) (see the view (a) of FIG. 10). Therefore, the cross section of each of the protrusions 124a and 124b cut along the Y-Z plane is rectangular.

Each of the protrusions 124a and 124b has a tip part corresponding to the vertex of the isosceles triangle, and a terminal part corresponding to the base of the isosceles triangle. The width of the terminal part, corresponding to the length of the base, is wider than the width of the uniform-width sections of the grooves 13a and 13c. Therefore, if the waveguide-side connector 1a is slid in the X direction to fit the protrusions 124a and 124b into the grooves 13a and 13c, the protrusions 124a and 124b engage with the respective openings of the uniform-width sections of the grooves 13a and 13c, as shown in the view (c) of FIG. 10.

Because the protrusions 124a and 124b engage with the respective openings of the uniform-width sections of the grooves 13a and 13c, movements of the waveguide-side connector 1a in the X direction are restricted. In applying the mechanism shown in FIG. 10, the protrusions 124a and 124b, which are rectangular in Y-Z cross section, still abut against the respective inner walls of the grooves 13a and 13c at the contact points C1, C2, C3, and C4 (see the view (c) of FIG. 5) and support the waveguide-side connector 1a.

As above, applying the mechanism of the fourth variation shown in FIG. 10 allows the inner walls of the grooves 13a and 13c to be supported at the contact points C1, C2, C3, and C4 as in the mechanism shown in FIG. 5. The engagement of the protrusions 124a and 124b with the openings of the uniform-width sections also allows the positioning in the X direction, so that high positioning accuracy is realized for all directions. Further, the connection of the waveguide-side connector 1a to the polymer waveguide substrate 1b is advantageously facilitated.

(Fifth variation) Now, reference will be made to FIG. 11. FIG. 11 shows diagrams (a bottom view, side views, and X-Z sectional views) for describing the structure of the waveguide-side connector according to a fifth variation. For convenience of description, the waveguide-side connector and the polymer waveguide substrate according to the fifth variation will be denoted as a waveguide-side connector 101a and a polymer waveguide substrate 101b, respectively.

Figure 11A:
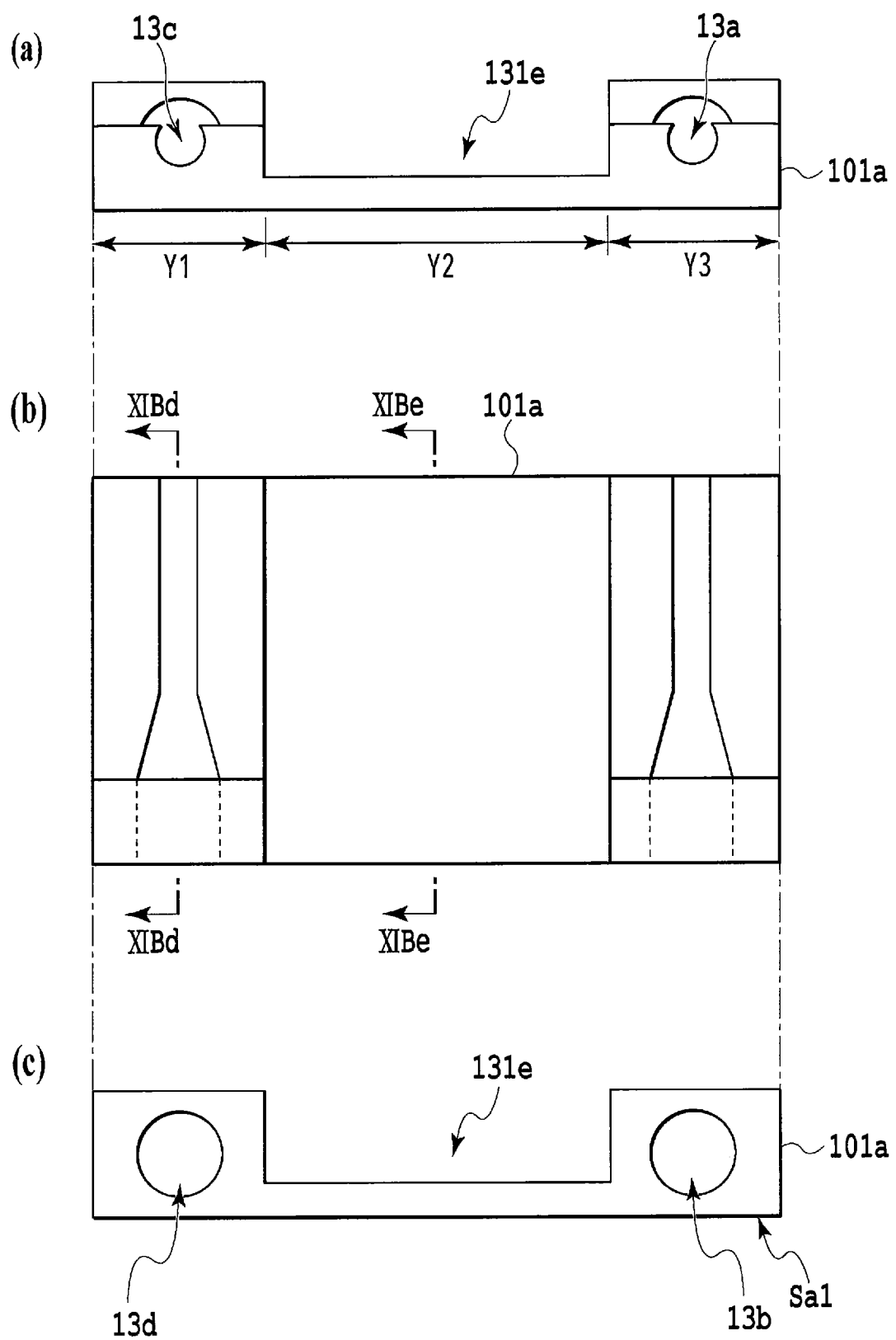
FIG. 11A shows schematic diagrams (a bottom view and side views) for describing the structure of the waveguide-side connector according to a fifth variation.
Figure 11B:
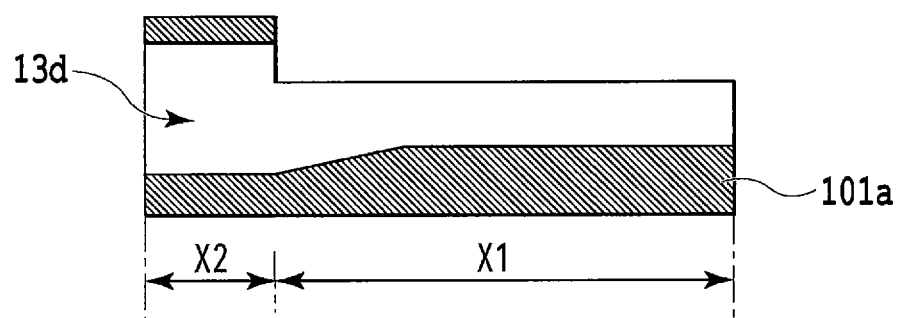
FIG. 11B shows schematic diagrams (X-Z sectional views) for describing the structure of the waveguide-side connector according to the fifth variation.
Figure 11B:
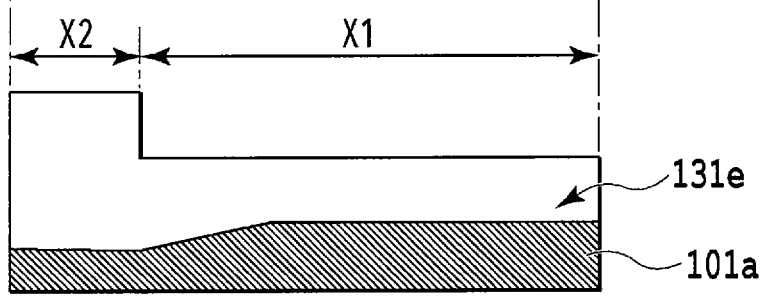

A view (a) of FIG. 11A to a view (e) of FIG. 11B corresponds to the view (a) of FIG. 2A to the view (e) of FIG. 2B showing the structure of the waveguide-side connector 1a, respectively. Dashed lines in the waveguide-side connector 1a in the view (b) of FIG. 11A illustrate an inner structure. The main differences between the waveguide-side connector 101a and the waveguide-side connector 1a are that the waveguide-side connector 101a has a recess 131e whereas the waveguide-side connector 1a has the recess 13e, and that the waveguide-side connector 101a does not have the lens unit 14.

As shown in the views (a)-(c) of FIG. 11A and the view (e) of FIG. 11B, the recess 131e forms a rectangular groove of a constant width (Y2) and a constant depth (a groove that is rectangular in Y-Z cross section). The waveguide-side connector 101a therefore does not have a step in the area of the recess 131e (the step at the boundary between the sections X1 and X2 in the waveguide-side connector 1a).

However, in the waveguide-side connector 101a, a step (see the view (d) of FIG. 11B) is still formed in each of the areas where the grooves 13a and 13c and the holes 13b and 13d are formed (the areas corresponding to Y1 and Y3 in the view (a) of FIG. 11A). Consequently, in applying the waveguide-side connector 101a, the step can still restrict movements of the waveguide-side connector 101a in the X direction and enable the positioning in the X direction, as in the structure shown in FIG. 5.

Figure 12:
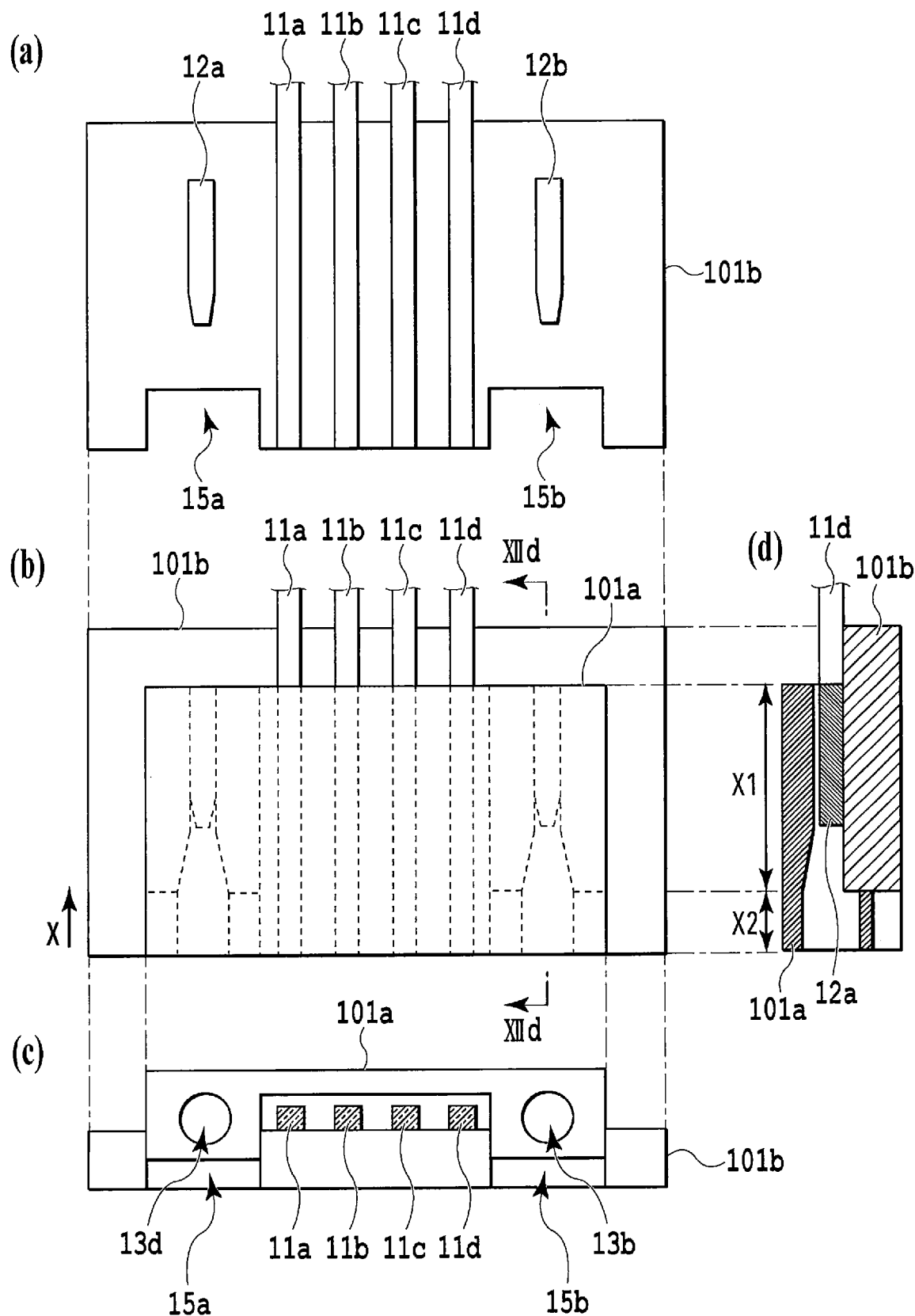
FIG. 12 shows schematic diagrams (a top view, a connected-state view, a side view, and an X-Z sectional view) for describing the structures of the polymer waveguide substrate and the optical waveguide unit in which the polymer waveguide substrate and the waveguide-side connector are connected together, according to the fifth variation.

Now, the structure of the polymer waveguide substrate 101b connected with the waveguide-side connector 101a will be described with reference to FIG. 12. FIG. 12 shows diagrams (a top view, a connected-state view, a side view, and an X-Z sectional view) for describing the structures of the polymer waveguide substrate and the optical waveguide unit in which the polymer waveguide substrate and the waveguide-side connector are connected together, according to the fifth variation.

A view (a) of FIG. 12 is a top view of the polymer waveguide substrate 101b. A view (b) of FIG. 12 is a top view of the optical waveguide unit 1 in which the waveguide-side connector 101a and the polymer waveguide substrate 101b are connected together. Dashed lines in the top surface Sa1 of the waveguide-side connector 1a in the view (b) of FIG. 12 illustrate an inner structure.

A view (c) of FIG. 12 is a side view of the optical waveguide unit 1 viewed along the X direction, according to the fifth variation. A view (d) of FIG. 12 is a sectional view of the optical waveguide unit 1 cut along a line XIId-XIId in the view (b) of FIG. 12, according to the fifth variation.

A difference between the polymer waveguide substrate 101b shown in the view (a) of FIG. 12 and the polymer waveguide substrate 1b shown in the view (a) of FIG. 4 is the presence or absence of cutouts 15a and 15b. As shown in views (b) and (d) of FIG. 12, the cutouts 15a and 15b accommodate parts defined by the areas Y1 and Y3 shown in the view (a) of FIG. 11 and by the section X2 (parts thicker in the Z direction). That is, in the example in FIG. 12, the cutouts 15a and 15b have the same depth in the X direction as the section X2 and substantially the same width in the Y direction as the respective areas Y1 and Y3.

Providing the above cutouts 15a and 15b can bring about a substantially coplanar relationship between the side surface of the waveguide-side connector 101a on which the openings of the holes 13b and 13d are located and the side surface of the polymer waveguide substrate 101b facing the fiber-side connector 2a.

The cutouts 15a and 15b may have a depth different from the depth of the section X2. For example, the depth of the cutouts 15a and 15b may be designed such that the side surface of the waveguide-side connector 101a is positioned to be protruded or recessed relative to the side surface of the polymer waveguide substrate 101b.

The cutouts 15a and 15b may be wider than the respective areas Y1 and Y3. This creates space between the waveguide-side connector 101a and the cutouts 15a and 15b. In practice, such space may be created due to an error occurring during production or due to clearances allowed in the design, and is therefore to be expected by those skilled in the art. Intentional or accidental creation of such space should fall within the technical scope of this embodiment.

According to the above configuration, if the end surfaces of the optical waveguide cores 11a, 11b, 11c, and 11d are aligned with the side surface of the polymer waveguide substrate 101b, the end surface of the optical waveguide unit 1 is aligned with the end surfaces of the optical waveguide cores 11a, 11b, 11c, and 11d. Consequently, when the optical waveguide unit 1 and the fiber-side connector 2a are connected, the end surfaces of the optical fiber cores 21a, 21b, 21c, and 21d exposed on the end surface of the fiber-side connector 2a are closely connected with the end surfaces of the optical waveguide cores 11a, 11b, 11c, and 11d.

The positioning mechanisms according to this embodiment and its variations have been described above. According to these positioning mechanisms, highly precise positioning can be realized with a simple structure in which the grooves that are arc-shaped in cross section are combined with the protrusions that are rectangular in cross section.

(Method for forming the grooves and the holes) Lastly, a method of forming the grooves 13a and 13c and the holes 13b and 13d will be described. The above-described positioning accuracy is based on the assumption that the cross-sectional centers of the grooves 13a and 13c to be coupled with the protrusions 12a and 12b align with the respective cross-sectional centers of the holes 13b and 13d receiving the metal pins 3a and 3b. As such, the alignment of these cross-sectional centers is important for ensuring the positioning accuracy.

Figure 13:
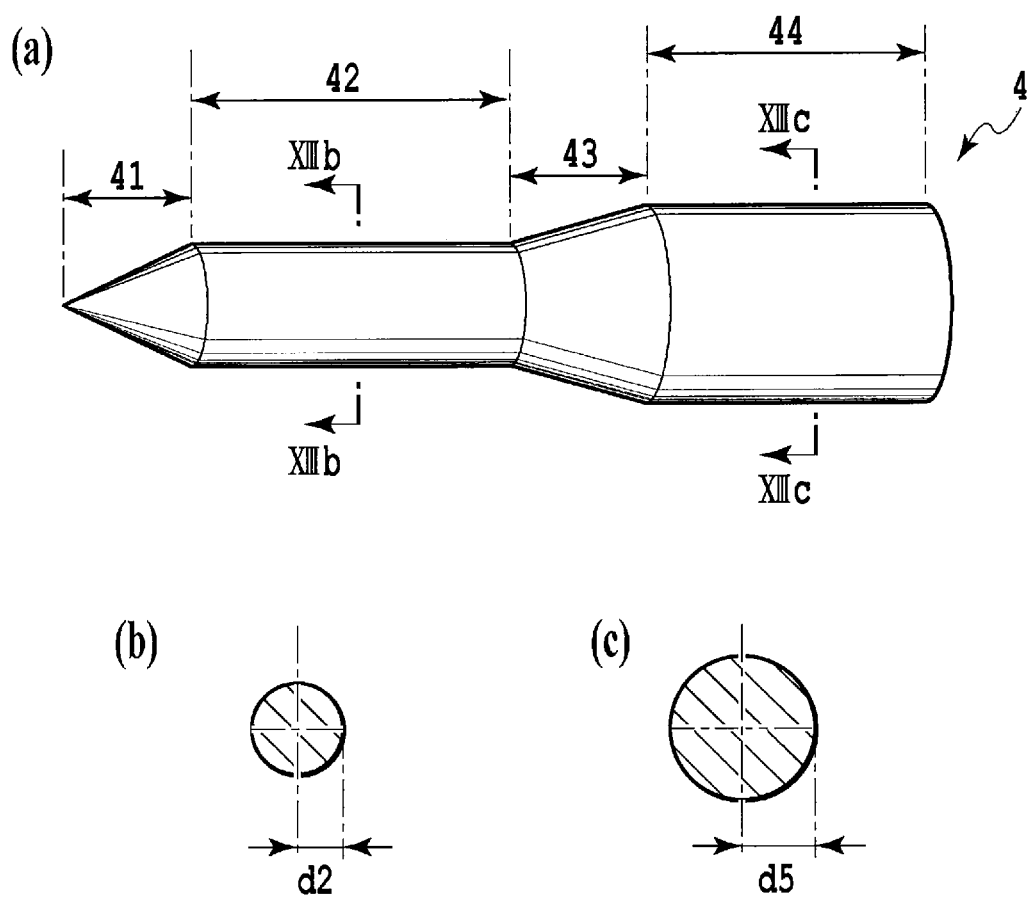
FIG. 13 shows schematic diagrams showing the structure of a mold used for forming the grooves and the holes.

In this embodiment, a method of forming the grooves 13a and 13c and the holes 13b and 13d using a mold 4 shown in FIG. 13 will be illustrated. FIG. 13 shows diagrams showing the structure of a mold used for forming the grooves and the holes. The mold 4 shown in FIG. 13 is exemplary, and any mold having similar structural portions is applicable.

As shown in the view (a) of FIG. 13, the mold 4 has a tip part 41, a groove forming part 42, a tapered-structure forming part 43, and a hole forming part 44. Parts other than the groove forming part 42 and the hole forming part 44 may be appropriately altered in shape according to implementations.

The groove forming part 42 is cylindrical, and has a circular cross section as shown in the view (b) of FIG. 13. The distance from the central axis to the periphery of the groove forming part 42 (the radius of the circle formed by the cross section) is the same as the radius of the arcs formed by the cross sections of the grooves 13a and 13c (d2 in the example in FIG. 5).

The hole forming part 44 is cylindrical, and has a circular cross section as shown in the view (c) in FIG. 13. The distance from the central axis to the periphery of the hole forming part 44 (the radius of the circle formed by the cross section) is the same as the radius of the circles formed by the cross sections of the holes 13b and 13d (d5). The central axis of the groove forming part 42 aligns with the central axis of the hole forming part 44.

Using the above mold 4 enables precisely forming the coaxial and continuous groove 13a and hole 13b, and the coaxial and continuous groove 13c and hole 13d.

While a preferred embodiment of the present disclosure has been described above with reference to the accompanying drawings, the present disclosure is not limited to the above examples. It is apparent that various changes or modifications within the scope of the claims may occur to those skilled in the art, and such changes and modifications should fall within the technical scope of the present disclosure.

The invention claimed is:

1. An optical connector used for connecting an optical waveguide substrate and an optical-fiber connector member, comprising:
    a plurality of positioning structures, each having a cylindrical hole for inserting another end of a pin which has an end inserted into the connector member, and a groove formed on a second surface perpendicular to a first surface on which an open end of the hole is located,
    wherein the groove and the hole are continuous, the groove has an arc-shaped cross section, and a center of a circle formed by a cross section of the hole and a center of an arc formed by the cross section of the groove are identical, and when the optical connector is coupled to the optical waveguide substrate that comprises a plurality of protrusions having a rectangular cross section, in each of the plurality of positioning structures, at least two corners of a corresponding protrusion among the plurality of protrusions are supported by an inner wall of the groove, and
    wherein a height of the protrusions is the same as a distance between an optical waveguide core disposed on one surface of the optical waveguide substrate on which the protrusions are located and the one surface, and a distance from a center of the arc formed by the cross section of the groove to the second surface is half the distance between the optical waveguide core and the surface.

2. The optical connector according to claim 1, wherein each of the plurality of positioning structures is formed by using a mold that has a first cylindrical part corresponding to a shape of the groove, and a second cylindrical part that has a center identical to a center of the first cylindrical part and corresponds to a shape of the hole.

3. The optical connector according to claim 1, wherein an opening width of the arc formed by the cross section of the groove is the same as a width of the protrusions, and four corners of the protrusions are supported by the inner wall of the groove.

4. The optical connector according to claim 1, wherein a thickness of the optical connector in a first part where the groove is located is smaller than a thickness of the optical connector in a second part where the hole is located, and a step formed at a boundary between the first part and the second part abuts against a corner of the optical waveguide substrate to position the optical connector in a longitudinal direction of the groove.

5. An apparatus equipped with an optical connector used for connecting an optical waveguide substrate and an optical-fiber connector member, wherein the optical connector comprises:
    a plurality of positioning structures, each having a cylindrical hole for inserting another end of a pin which has an end inserted into the connector member, and a groove formed on a second surface perpendicular to a first surface on which an open end of the hole is located,
    wherein the groove and the hole are continuous, the groove has an arc-shaped cross section, and a center of a circle formed by a cross section of the hole and a center of an arc formed by the cross section of the groove are identical, and when the optical connector is coupled to the optical waveguide substrate that comprises a plurality of protrusions having a rectangular cross section, in each of the plurality of positioning structures, at least two corners of a corresponding protrusion among the plurality of protrusions are supported by an inner wall of the groove, and
    wherein a height of the protrusions is the same as a distance between an optical waveguide core disposed on one surface of the optical waveguide substrate on which the protrusions are located and the one surface, and a distance from a center of the arc formed by the cross section of the groove to the second surface is half the distance between the optical waveguide core and the surface.

6. The apparatus according to claim 5, wherein each of the plurality of positioning structures is formed by using a mold that has a first cylindrical part corresponding to a shape of the groove, and a second cylindrical part that has a center identical to a center of the first cylindrical part and corresponds to a shape of the hole.

7. The apparatus according to claim 5, wherein an opening width of the arc formed by the cross section of the groove is the same as a width of the protrusions, and four corners of the protrusions are supported by the inner wall of the groove.

* * * * *